(12) United States Patent
    Celik

(10) Patent No.: US 10,040,317 B2
(45) Date of Patent: Aug. 7, 2018

(54) NON-PNEUMATIC SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 120 days.

(21) Appl. No.: 15/351,672

(22) Filed: Nov. 15, 2016

(65) Prior Publication Data

US 2018/0134083 A1    May 17, 2018

(51) Int. Cl.
| | |
|---|---|
| B60C 7/14 | (2006.01) |
| B60C 7/18 | (2006.01) |
| B60C 7/12 | (2006.01) |
| B60B 9/26 | (2006.01) |
| B60B 1/02 | (2006.01) |
| B60C 7/10 | (2006.01) |

(52) U.S. Cl.
CPC .............. B60C 7/14 (2013.01); B60B 1/0276 (2013.01); B60B 9/26 (2013.01); B60C 7/12 (2013.01); B60C 7/18 (2013.01); *B60C 2007/107* (2013.01); *B60C 2007/146* (2013.01)

(58) Field of Classification Search
CPC ........... B60B 9/26; B60B 1/0276; B60C 7/10; B60C 7/12; B60C 7/14; B60C 7/143; B60C 7/18; B60C 2007/107; B60C 2007/146
See application file for complete search history.

(56) References Cited

U.S. PATENT DOCUMENTS

| | | | |
|---|---|---|---|
| 479,255 | A | 7/1892 | Dunlop |
| 482,175 | A | 9/1892 | Hollafolla |
| 624,315 | A | 5/1899 | Finin |
| 1,002,003 | A | 8/1911 | Simonson |
| 1,233,722 | A | 7/1917 | Smith |
| 1,389,285 | A | 8/1921 | Althoff |
| 1,451,517 | A | 4/1923 | Smith |
| 1,930,764 | A | 10/1933 | Mallory |
| 3,493,027 | A | 2/1970 | Dewhirst |
| 4,226,273 | A | 10/1980 | Long |
| 4,235,270 | A | 11/1980 | Kahaner |
| 4,602,823 | A | 7/1986 | Berg |
| 5,343,916 | A | 9/1994 | Duddey |

(Continued)

FOREIGN PATENT DOCUMENTS

| | | |
|---|---|---|
| GB | 2177355 A | 1/1987 |
| JP | 2009286208 A | 12/2009 |

(Continued)

OTHER PUBLICATIONS

European Search Report dated Feb. 26, 2018 for Application Serial No. EP17199837.

*Primary Examiner* — Kip T Kotter
(74) *Attorney, Agent, or Firm* — Robert N. Lipcsik

(57) ABSTRACT

A wheel and tire assembly for a mobile vehicle in accordance with the present invention includes an inner central rim, a flexible ring mounted on the inner central rim, and a spoke structure extending between the inner central rim and the flexible ring. The spoke structure defines a plurality of cavities and alternating radially extending openings disposed concentrically about the inner central rim and allowing the flexible ring to deflect under load.

3 Claims, 4 Drawing Sheets

(56) References Cited

U.S. PATENT DOCUMENTS

| | | | |
|---|---|---|---|
| 5,800,643 A | | 9/1998 | Frankowski |
| 6,068,721 A | | 5/2000 | Dyer |
| 6,260,598 B1 | | 7/2001 | Tanaka |
| 8,962,120 B2 | | 2/2015 | Delfino |
| 9,387,726 B2 | * | 7/2016 | Choi ........................ B60C 7/18 |
| D784,917 S | * | 4/2017 | Schaedler ................... D12/592 |
| D792,332 S | * | 7/2017 | Schaedler ................... D12/501 |
| D792,333 S | * | 7/2017 | Schaedler ................... D12/501 |
| 2004/0069385 A1 | | 4/2004 | Timoney |
| 2006/0144488 A1 | * | 7/2006 | Vannan .................... B60C 7/10 |
| | | | 152/7 |
| 2010/0193097 A1 | | 8/2010 | McNier |
| 2010/0200131 A1 | | 8/2010 | Iwase |
| 2012/0205017 A1 | | 8/2012 | Endicott |
| 2015/0136285 A1 | | 5/2015 | Labuschagne |
| 2016/0016426 A1 | | 1/2016 | Endicott |
| 2016/0214435 A1 | * | 7/2016 | Schaedler ................ B60C 7/10 |
| 2018/0001704 A1 | * | 1/2018 | Reinhardt ................ B60C 7/14 |
| 2018/0086141 A1 | * | 3/2018 | Schaedler ................ B60C 7/10 |
| 2018/0093528 A1 | * | 4/2018 | Schaedler ............ B60B 15/025 |

FOREIGN PATENT DOCUMENTS

| | | |
|---|---|---|
| JP | 2011219009 A | 4/2011 |
| WO | 2016123180 A2 | 8/2016 |

\* cited by examiner

NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel and tire assembly for a mobile vehicle in accordance with the present invention includes an inner central rim, a flexible ring mounted on the inner central rim, and a spoke structure extending between the inner central rim and the flexible ring. The spoke structure defines a plurality of cavities and alternating radially extending openings disposed concentrically about the inner central rim and allowing the flexible ring to deflect under load.

According to another aspect of the assembly, the spoke structure comprises a polymer material.

According to still another aspect of the assembly, the spoke structure comprises a homogenous polymer material.

According to yet another aspect of the assembly, each cavity of the plurality of cavities has a common radial dimension.

According to still another aspect of the assembly, each cavity of the plurality of cavities has a common axial length equal to a uniform axial thickness of the spoke structure.

According to yet another aspect of the assembly, the assembly further comprises a reinforcing layer interlaced circumferentially and radially about the plurality of cavities and alternating openings for further tuning the flexibility/stiffness of the structure.

According to still another aspect of the assembly, the spoke structure comprises a uniform rubber material.

A method in accordance with the present invention non-pneumatically supports a mobile vehicle. The method includes the steps of: rotating an inner central rim about a horizontal axis; mounting the inner central rim on to a flexible ring; extending a spoke structure axially and radially between the inner central rim and the flexible ring; defining a plurality of axially extending cavities and alternating radially extending openings concentrically about the inner central rim; and vertically loading the flexible ring such that the flexible ring and a part of the spoke structure adjacent to the flexible ring both deflect vertically.

According to another aspect of the method, the spoke structure comprises a polymer material.

According to still another aspect of the method, the spoke structure comprises a homogenous polymer material.

According to yet another aspect of the method, each cavity of the plurality of cavities has a common radial dimension.

According to still another aspect of the method, each cavity of the plurality of cavities has a common axial length equal to a uniform axial thickness of the spoke structure.

According to yet another aspect of the method, another step interlaces a reinforcing layer circumferentially and radially about the plurality of cavities for further tuning the flexibility/stiffness of the spoke structure.

According to yet another aspect of the method, other steps tune the flexibility/stiffness of the spoke structure and interlace a reinforcing layer circumferentially and radially about the plurality of cavities.

According to still another aspect of the method, the spoke structure comprises a uniform rubber material.

According to yet another aspect of the method, another step buckles the spoke structure at a predetermined load on the spoke structure.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly, such as that described in US 2004/0069385, incorporated herein by reference in its entirety, may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Figure 4:
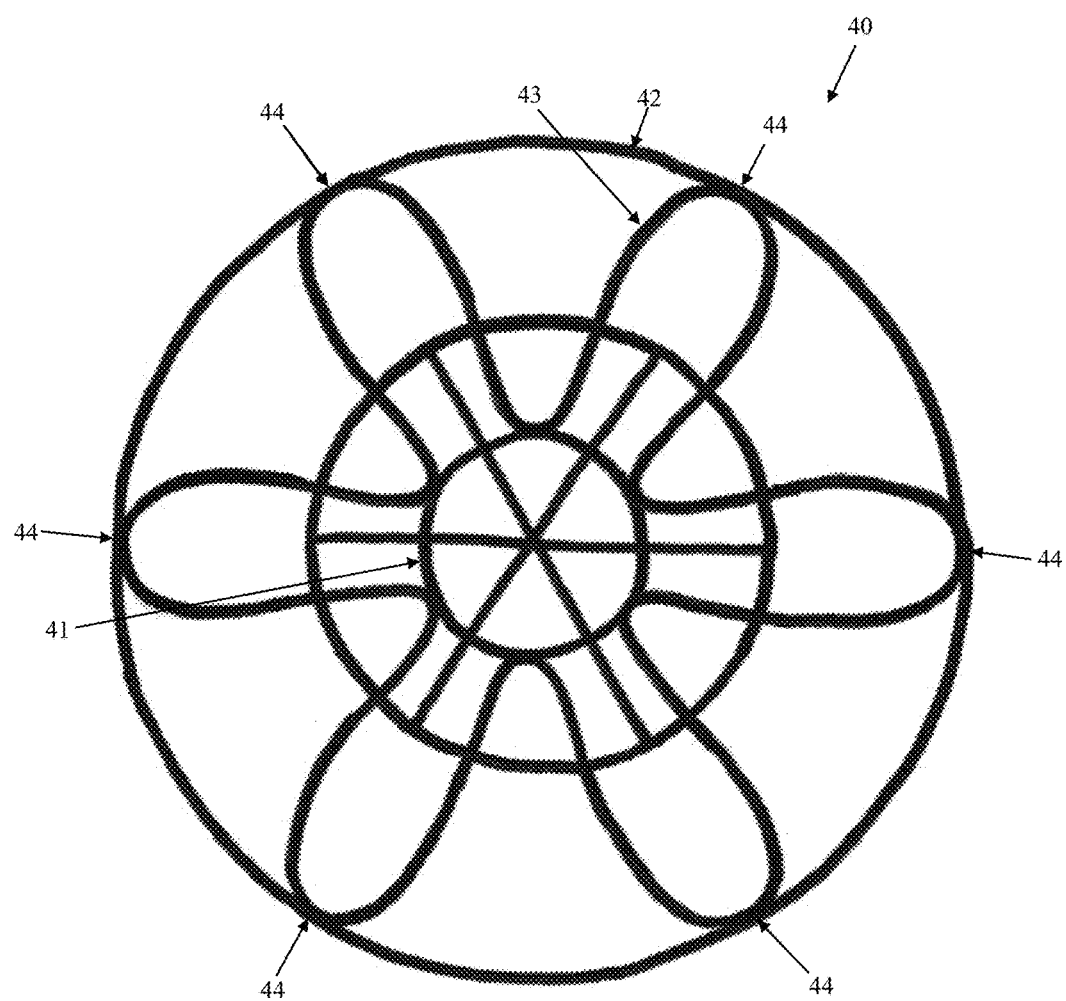
FIG. 4 is a schematic side view of a conventional wheel/tire assembly.

As shown in FIG. 4, another conventional wheel/tire assembly 40 may be formed from a lightweight composite material, such as carbon fiber reinforced polyamide. The assembly 40 may have a cylindrical central hub 41 and a circular outer flexible rim 42 mounted on the central hub 41 by an endless looped spring band 43 extending between the central hub and the circular rim 42. Six radial loops 44 may be defined by the spring band 43. The spring band 43 may be attached to the central hub 41 and to the circular rim 42 by any suitable means, such as adhesion, cohesion, soldering and/or mechanical fixing by means of bolts, rivets, and/or clamps.

Figure 1:
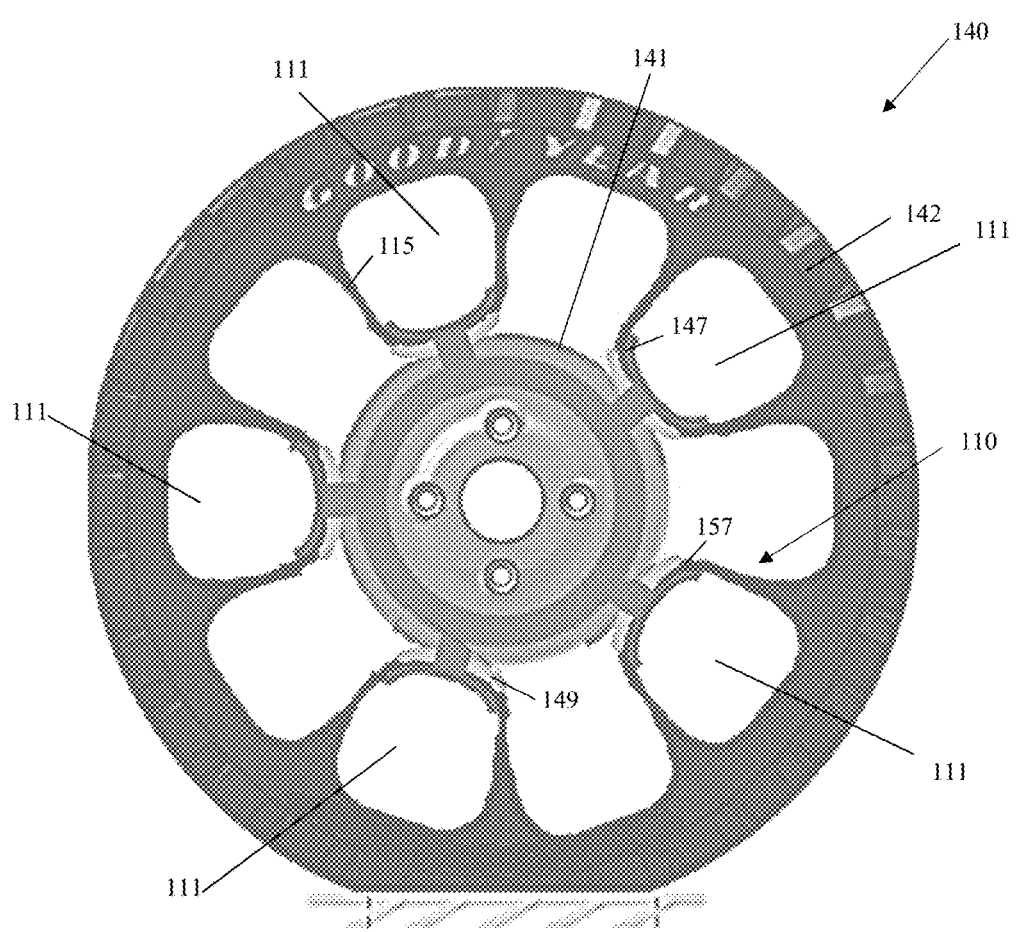
FIG. 1 is a schematic side view of an example assembly in accordance with the present invention.
Figure 2:
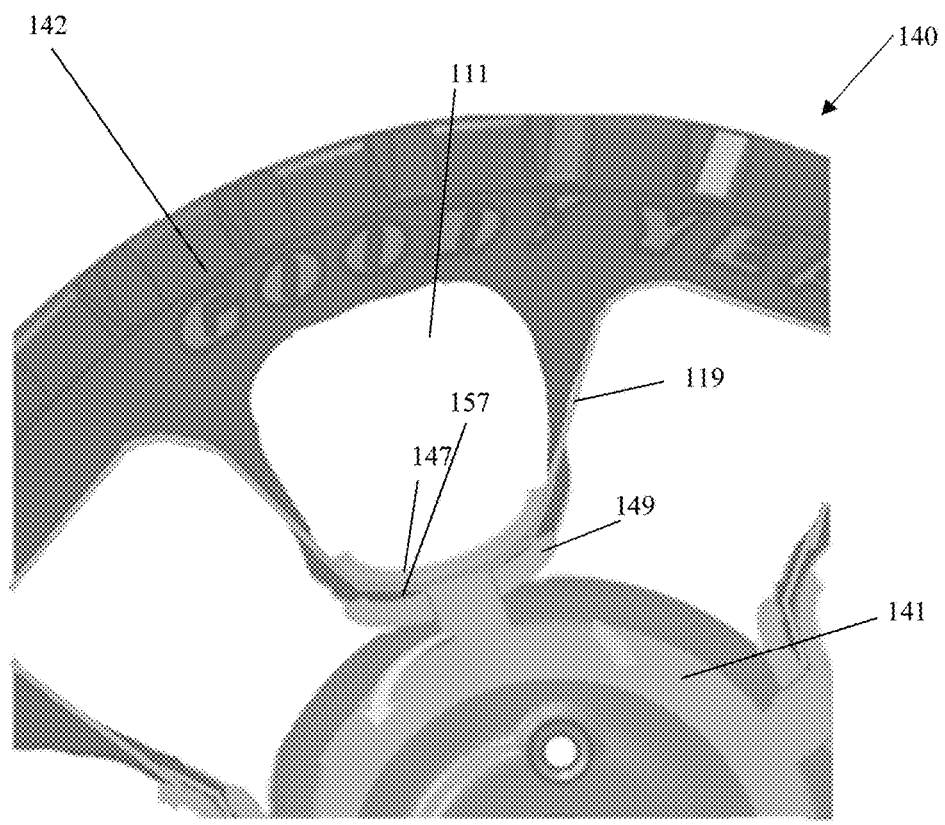
FIG. 2 is a schematic detail view of part of the assembly of FIG. 1.

As shown in FIGS. 1 & 2, an example wheel/tire assembly 140 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 140 may have an inner central rim 141, such as an automobile wheel, and a circular outer flexible ring 142, which may include a shear band and tread structure, mounted on the inner central rim 141 by a continuous cord/fabric reinforced spoke structure 110 extending between the inner central rim and the outer ring.

The spoke structure 110 may define a plurality of cavities 111 disposed concentrically about the inner central rim 141 allowing the spoke structure to deflect under load thereby defining a suitable balance between flexibility for ride comfort and traction within a footprint of the assembly 140 and stiffness for vehicle handling, low rolling resistance, and low heat build-up within the spoke structure. The cavities 111 of the spoke structure 110 may further define openings for arms 147 of the inner central rim 141 to extend therethrough and secure the spoke structure to the inner central rim. The arms 147 may engage portions 157 of the spoke structure 110 in a mechanical interlocking arrangement. The inner central rim 141 may further include plates 149 that, along with the arms 147 may sandwich the portions 157 of the spoke structure 110 and create a further frictional and/or adhesive securement between the inner central rim 141 and the spoke structure. The spoke structure 110 may comprise a homogenous or heterogeneous polymer and/or a filled polymer.

Spokes 115 of the spoke structure 110 may be curved inwardly or outwardly for mitigating or enhancing buckling of the spokes. The spokes 115 may include one or more reinforcing layers 119. The layer(s) 119 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes 115 may be oriented at angle between 0 degrees and 90 degrees. The spokes 115 may be continuously reinforced across their entire axial length. Continuous reinforcement layer(s) 119 may extend radially outward to multiple locations adjacent to a shear band at the outer flexible ring 142.

Each cavity 111 may have a common cross sectional profile about the axis of rotation of the assembly. Further, each cavity 111 may have a common axial length equal to a uniform axial thickness of the spoke structure 110. Each cavity 111 may be curvedly shaped to prevent "pinch" points on the reinforcement layer(s) 119 and mitigate compressive stress concentrations on the reinforcement layer(s). The number of cavities 111 may be between 2 and 60 for large scale assemblies 140. The inner central rim 141 may include steel, cast iron, aluminum, aluminum alloys, magnesium allows, and/or iron alloys.

Figure 3:
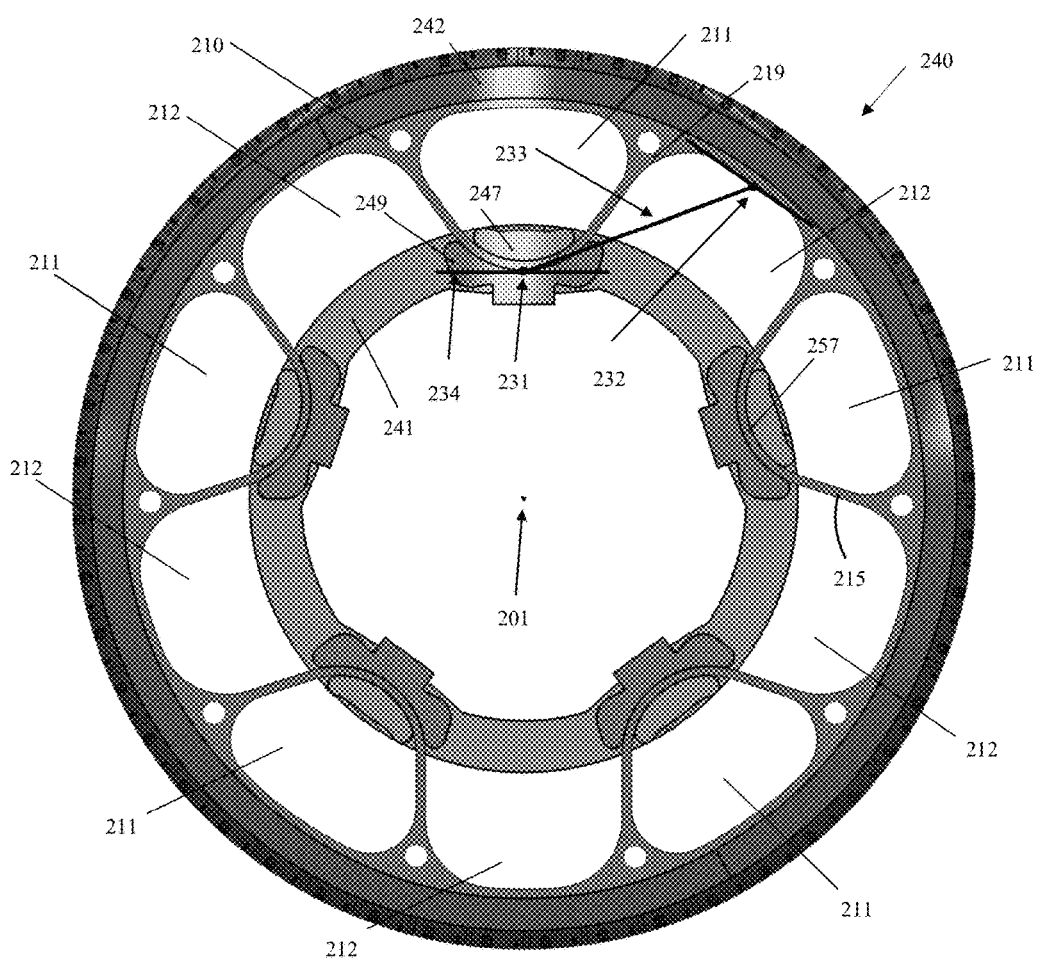
FIG. 3 is a schematic side view of another example assembly in accordance with the present invention.

As shown in FIG. 3, an example wheel/tire assembly 240 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 240 may have an inner central rim 241, such as an automobile wheel, and a circular outer flexible ring 242, which may include a shear band and tread structure, mounted on the inner central rim 241 by a continuous cord/fabric reinforced spoke structure 210 extending between the inner central rim and the outer ring.

The spoke structure 210 may define a plurality of alternating cavities 211 and inlet openings 212 disposed concentrically about the inner central rim 241 allowing the spoke structure to deflect under load thereby defining a suitable balance between flexibility for ride comfort and traction within a footprint of the assembly 240 and stiffness for vehicle handling, low rolling resistance, and low heat build-up within the spoke structure. The cavities 211 of the spoke structure 210 may further define openings for arms 247 of the inner central rim 241 to extend therethrough and secure the spoke structure to the inner central rim. The arms 247 may engage portions 257 of the spoke structure 210 in a mechanical interlocking arrangement. The inner central rim 241 may further include plates 249 that, along with the arms 247 may sandwich the portions 257 of the spoke structure 210 and create a further frictional and/or adhesive securement between the inner central rim 241 and the spoke structure. The spoke structure 210 may comprise a homogenous or heterogeneous polymer and/or a filled polymer.

Spokes 215 of the spoke structure 210 may be curved inwardly or outwardly for mitigating or enhancing buckling of the spokes. The spokes 215 may include one or more reinforcing layers 219. The layer(s) 219 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement in the spokes 215 may be oriented at angle between 0 degrees and 90 degrees. The spokes 215 may be continuously reinforced across their entire axial length. Continuous reinforcement layer(s) 219 may extend radially outward to multiple locations adjacent to a shear band at the outer flexible ring 242.

Each cavity 211 and inlet opening 212 may have a common cross sectional profile about the axis of rotation of the assembly. Further, each cavity 211 and inlet opening 212 may have a common axial length equal to a uniform axial thickness of the spoke structure 210. Each cavity 211 may be curvedly shaped to prevent "pinch" points on the reinforcement layer(s) 219 and mitigate compressive stress concentrations on the reinforcement layer(s). The number of cavities 211 may be between 2 and 60 for large scale assemblies 240.

As shown in FIG. 3, point(s) 231 may represent point(s) on the spoke structure 210 nearest the axis of rotation 201 of the wheel/tire assembly 241. Point(s) 232 on the spoke structure may represent point(s) in the inlet openings 212 farthest from the axis 201 of rotation of the assembly 241. Line(s) 233 may represent a straight line connecting one point 231 with an adjacent point 232. Line(s) 234 may represent line(s) perpendicular to radial line(s) extending through the point(s) 231. The angle between line(s) 233 and adjacent line(s) 234 may be between −45 degrees and 90 degrees. The inner central rim 241 may include steel, cast iron, aluminum, aluminum alloys, magnesium allows, iron alloys, plastics, and/or composites. The spoke structure 210 may further have additional cavities for further adjusting the flexibility of the spoke structure Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A wheel and tire assembly for a mobile vehicle comprising:
    an inner central rim;
    an outer flexible ring mounted to the inner central rim; and
    a spoke structure extending radially between the central rim and the flexible ring,
    the spoke structure defining a plurality of cavities and an alternating plurality of radially extending openings disposed concentrically about the inner central rim and allowing the flexible ring to deflect under load, the spoke structure being constructed of a homogenous polymer material, the plurality of cavities receiving arms of the inner central rim to extend therethrough and secure the spoke structure to the inner central rim, the arms engaging portions of the spoke structure in a mechanical interlocking arrangement,
    the inner central rim further including plates that, along with the arms of the inner central rim, sandwiching the portions of the spoke structure and creating a further frictional securement between the inner central rim and the spoke structure.

2. The wheel and tire assembly as set forth in claim 1 wherein each cavity of the plurality of cavities has a common radial dimension.

3. The wheel and tire assembly as set forth in claim 1 wherein the spoke structure comprises a uniform rubber material.

* * * * *